US012693472B2

(12) United States Patent
Narayanan et al.

(10) Patent No.: US 12,693,472 B2
(45) Date of Patent: Jul. 28, 2026

(54) TECHNIQUES FOR INCREASING A QUALITY FACTOR OF AN OPTICAL FILTER WITHOUT SUBSTANTIALLY INCREASING FILTER SIZE AND APPLICATIONS THEREOF

(71) Applicant: Honeywell International Inc., Charlotte, NC (US)

(72) Inventors: Chellappan Narayanan, Phoenix, AZ (US); Lee K. Strandjord, Tonka Bay, MN (US); Matthew Wade Puckett, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 141 days.

(21) Appl. No.: 18/614,404

(22) Filed: Mar. 22, 2024

(65) Prior Publication Data

US 2025/0298190 A1     Sep. 25, 2025

(51) Int. Cl.
  *G01C 19/66*       (2006.01)
  *G02B 6/26*        (2006.01)
(52) U.S. Cl.
  CPC ........... *G02B 6/262* (2013.01); *G01C 19/661* (2013.01)
(58) Field of Classification Search
  CPC ...... G02B 6/262; G02B 6/02052; G02B 6/42; G01C 19/661; G01C 19/727; G01C 19/721
  See application file for complete search history.

(56) References Cited

U.S. PATENT DOCUMENTS

| | | | | | |
|---|---|---|---|---|---|
| 5,004,342 | A | * | 4/1991 | Bernard | ............... G01C 19/727 |
| | | | | | 372/94 |
| 9,459,101 | B1 | * | 10/2016 | Strandjord | ............. G01C 19/72 |
| 9,587,945 | B2 | | 3/2017 | Strandjord et al. | |
| 11,204,246 | B1 | | 12/2021 | Strandjord et al. | |
| 2005/0286602 | A1 | | 12/2005 | Gunn et al. | |
| 2010/0024560 | A1 | | 2/2010 | Shcheglov | |

(Continued)

FOREIGN PATENT DOCUMENTS

EP          2530504 A1    12/2012

OTHER PUBLICATIONS

Benson et al., 2006. "Micro-optical resonators for miccrolasers and integrated optoelectronics", Frontiers in Planar Lightwave Circuit Tecnology: Design, Simulation, and Fabrication, pp. 39 through 70.

(Continued)

*Primary Examiner* — Jonathan M Hansen
(74) *Attorney, Agent, or Firm* — Fogg & Powers LLC

(57)          ABSTRACT
An optical filter twice filters an optical signal. The optical filter includes a first optical waveguide, an elliptical optical resonator, and a second optical waveguide. The optical signal is coupled from an input/output port of the optical filter which is a port of the first optical waveguide. A portion of the optical signal is coupled through and filtered by the elliptical optical resonator. The filtered optical signal is emitted from another port of the optical filter which is a port of the second optical waveguide. A reflector reflects the filtered optical signal back into the other port. The filtered optical signal is coupled through and filtered by the elliptical optical resonator to the input/output port. A twice filtered optical signal is emitted from the input/output port.

13 Claims, 5 Drawing Sheets

(56) References Cited

U.S. PATENT DOCUMENTS

| | | | | |
|---|---|---|---|---|
| 2019/0348814 A1* | 11/2019 | Baehr-Jones | ......... | G02F 1/2257 |
| 2022/0200228 A1* | 6/2022 | Tran | ..................... | H01S 5/4068 |

OTHER PUBLICATIONS

Dubey et al., "Near-field characterization of a Bloch-surface-wave-based 2D disk resonator", Optics Letters, Nov. 1, 2016, vol. 41, No. 21, pp. 4867 through 4870.

Schwelb, Otto, "Some Novel Photonic Bandpass and Bandstop Filters", Proc. ISMOT 2001 (2001), 19-23. pp. 19 through 23.

Zamek et al., "Micro-Resonator with metallic mirrors coupled to a bus waveguide", Optics Express, Jan. 25, 2011, vol. 19, No. 3, pp. 2417 through 2425.

European Patent Office, "Partial European Search Report", dated Aug. 5, 2025, from EP Application No. 25160432.8, from Foreign Counterpart to U.S. Appl. No. 18/614,404, pp. 1 through 12, Published: EP.

European Patent Office, "Extended European Search Report", dated Oct. 27, 2025, from EP Application No. 25160432.8, from Foreign Counterpart to U.S. Appl. No. 18/614,404, pp. 1 through 10, Published: EP.

* cited by examiner

229

Processor Circuitry
229 1

Memory Circuitry 229 2

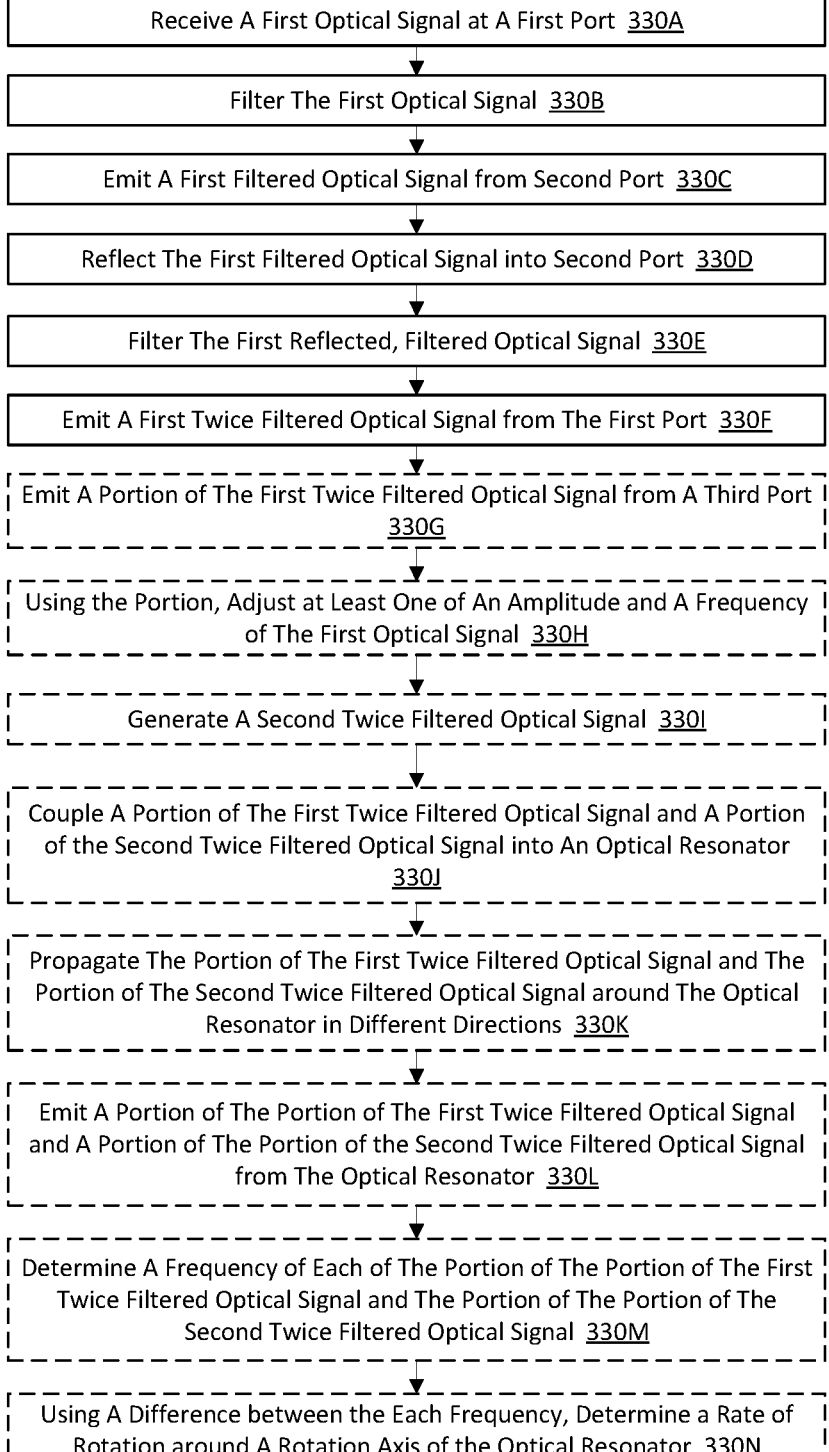

330

Receive A First Optical Signal at A First Port 330A

Filter The First Optical Signal 330B

Emit A First Filtered Optical Signal from Second Port 330C

Reflect The First Filtered Optical Signal into Second Port 330D

Filter The First Reflected, Filtered Optical Signal 330E

Emit A First Twice Filtered Optical Signal from The First Port 330F

Emit A Portion of The First Twice Filtered Optical Signal from A Third Port 330G Using the Portion, Adjust at Least One of An Amplitude and A Frequency of The First Optical Signal 330H Generate A Second Twice Filtered Optical Signal 330I Couple A Portion of The First Twice Filtered Optical Signal and A Portion of the Second Twice Filtered Optical Signal into An Optical Resonator 330J Propagate The Portion of The First Twice Filtered Optical Signal and The Portion of The Second Twice Filtered Optical Signal around The Optical Resonator in Different Directions 330K Emit A Portion of The Portion of The First Twice Filtered Optical Signal and A Portion of The Portion of the Second Twice Filtered Optical Signal from The Optical Resonator 330L Determine A Frequency of Each of The Portion of The Portion of The First Twice Filtered Optical Signal and The Portion of The Portion of The Second Twice Filtered Optical Signal 330M Using A Difference between the Each Frequency, Determine a Rate of Rotation around A Rotation Axis of the Optical Resonator 330N

FIG. 3

TECHNIQUES FOR INCREASING A QUALITY FACTOR OF AN OPTICAL FILTER WITHOUT SUBSTANTIALLY INCREASING FILTER SIZE AND APPLICATIONS THEREOF

BACKGROUND

To reduce phase (or frequency) noise of an optical signal, the optical signal is filtered by an optical filter with a high-quality factor. However, the quality factor of the optical filter may be insufficient. To increase the quality factor, another filter is optically coupled to an output of the optical filter. As a result, the space consumed by the combined filters practically doubles. This is undesirable for many applications where space is limited.

SUMMARY

In some aspects, the techniques described herein relate to an apparatus for reducing phase noise of an optical signal, the apparatus including: a first optical waveguide including a first surface, a first port, and a second port; a second optical waveguide including a second surface, a third port, and a fourth port; an optical resonator including a first portion of a third surface and a second portion of the third surface; wherein the first surface is adjacent and optically coupled to the first portion of the third surface; wherein the second surface is adjacent and optically coupled to the second portion of the third surface; and an optical reflector optically coupled to the third port.

In some aspects, the techniques described herein relate to a method for reducing phase noise of an optical signal, the method including: receiving a first optical signal at a first port of a filter; filtering the first optical signal; emitting a first filtered optical signal from a second port of the filter; reflecting the first filtered optical signal into the second port of the filter; and emitting a first twice filtered optical signal from the first port of the filter.

In some aspects, the techniques described herein relate to a resonant fiber optical gyroscope (RFOG) including: an optical signal source including at least one filtered optical signal generator and configured to generate a first twice filtered optical signal and a second twice filtered optical signal, wherein each filtered optical signal generator includes: an optical filter including: a first optical waveguide including a first surface, a first port, and a second port, wherein the first port is configured to emit the first twice filtered optical signal; a second optical waveguide including a second surface, a third port, and a fourth port; an optical resonator including a first portion of a third surface and a second portion of the third surface; wherein the first surface is adjacent and optically coupled to the first portion of the third surface; wherein the second surface is adjacent and optically coupled to the second portion of the third surface; and an optical reflector optically coupled to the third port; an optical signal separation circuit including an input/output port optically coupled to the first port, an input port, and an output port; an optical signal generator including a laser and optically coupled to the input port and configured to emit an optical signal; an optical detector optically coupled to the second port; and control circuitry coupled to the optical detector and the optical signal generator; a first optical signal separation circuit including a first circuit port, a second circuit port, and a third circuit port, and configured to receive, at the first circuit port, the first twice filtered optical signal from the optical signal source; a second optical signal separation circuit including a fourth circuit port, a fifth circuit port, and a sixth circuit port, and configured to receive, at the fourth circuit port, the second twice filtered optical signal from the optical signal source; an optical resonator including a rotation axis; a four port signal separation circuit including two mirrors, a seventh circuit port optically coupled to the third circuit port, an eighth circuit port optically coupled to the sixth circuit port, an ninth circuit port, and a tenth circuit port, wherein the ninth and tenth circuit ports are optically coupled to the optical resonator, wherein the four port signal separation circuit is configured to optically couple a portion of each of the first twice filtered and the second twice filtered optical signals into the optical resonator; processing circuitry including processor circuitry electrically coupled to memory circuitry; a first frequency detector coupled to the second circuit port and the processing circuitry, and configured to determine a frequency of a portion of the portion of the second twice filtered optical signal emitted from the optical resonator; wherein the four port signal separation circuit is further configured to optically couple a portion of the portion of the first twice filtered optical signal to the first frequency detector; and a second frequency detector coupled to the fifth circuit port and the processing circuitry, and configured to determine a frequency of a portion of the portion of the first twice filtered optical signal emitted from the optical resonator; wherein the four port signal separation circuit is further configured to optically couple a portion of the portion of the second twice filtered optical signal to the second frequency detector; wherein the processing circuitry is configured to determine a rate of rotation around the rotation axis of the optical resonator using the frequency of a portion of the portion of the first twice filtered optical signal and the frequency of a portion of the portion of the second twice filtered optical signal.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 3 illustrates a flow diagram of one embodiment of a method for emitting an optical beam with reduced phase noise according to embodiments of the invention.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
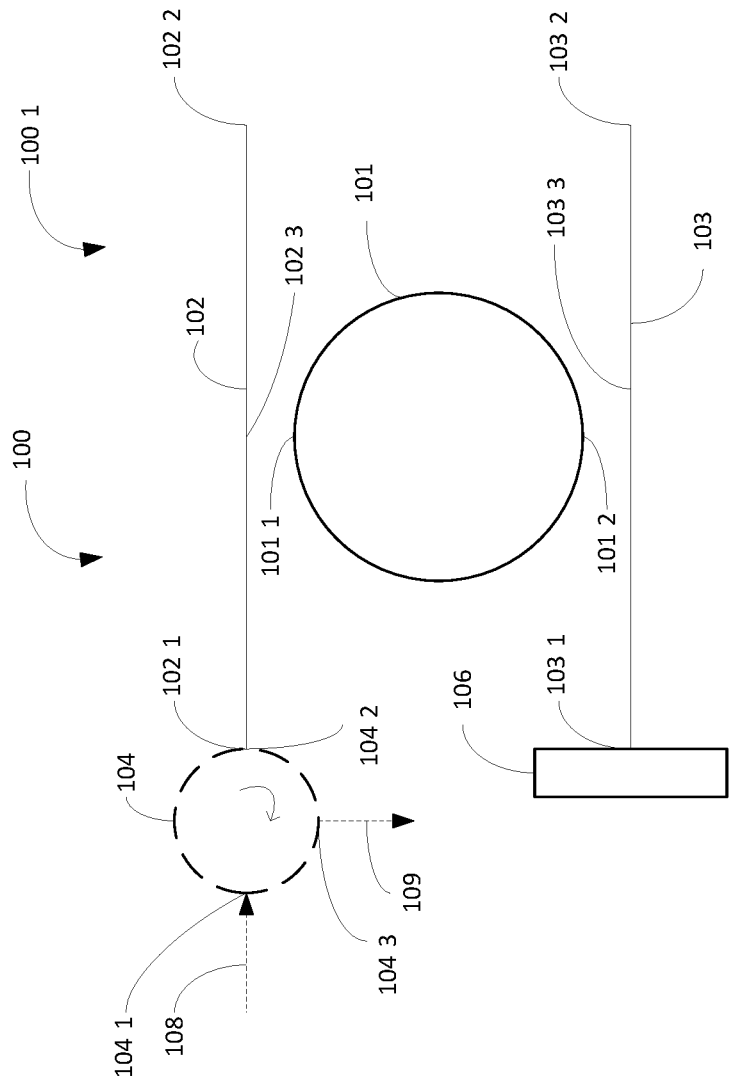
FIG. 1A illustrates a diagram of one embodiment of an optical filter according to embodiments of the invention.

In the following detailed description, reference is made to the accompanying drawings that form a part hereof, and in which is shown by way of illustration specific illustrative embodiments. However, it is to be understood that other embodiments may be utilized and that structural, mechanical, and/or electrical changes may be made. Furthermore, each method presented in the drawing figures and the specification is not to be construed as limiting the order in which the individual steps may be performed. The following detailed description is not to be taken in a limiting sense.

Embodiments of the invention are an optical filter including an optical resonator, a first optical waveguide optically coupled to the optical and comprising a first port, a second optical waveguide optically coupled to the optical resonator and comprising a second port, and a reflector optically coupled to the second port. An optical resonator includes an optical ring resonator, an optical race track resonator, and any other type of optical resonator.

The first port is configured to receive an input optical signal which has a carrier frequency within a resonance of the optical resonator and which is optically coupled to the optical resonator. A first optical signal, derived from the input optical signal, is optically coupled from the optical resonator to the second optical waveguide. The first optical signal has lower phase noise than the input optical signal due to the quality factor of the optical resonator.

Conventionally, in absence of the reflector, the second port emits the first optical signal. However, in embodiments of the invention, a reflector is mounted at the second port. Thus, the first signal is reflected back into the second optical waveguide and is optically coupled to the optical resonator. An output optical signal, derived from the first optical signal, is optically coupled from the optical resonator to the first optical waveguide. The output optical signal has a lower phase noise than the first optical signal due to the quality factor of the optical resonator. The output optical signal is emitted from the first port.

Thus, by causing an optical signal to twice be filtered by the same optical resonator, an output optical signal can be provided that has about one half of the line width of the input optical signal. Further, the size of the optical filter is not significantly increased.

Optionally, the optical filter further includes an optical signal separation circuit. The optical signal separation circuit includes an input circuit port, an input/output circuit port, and an output circuit port. The optical signal separation circuit is configured to receive the input optical signal at the input circuit port and transmit the input optical signal from the input/output circuit port. The optical signal separation circuit is further configured to receive the output optical signal at the input/output circuit port and transmit the output optical signal from the output circuit port.

FIG. 1A illustrates a diagram of one embodiment of an optical filter 100 according to embodiments of the invention. The optical filter 100 includes an optical resonator 101, a first optical waveguide 102, a second optical waveguide 103, and an optical reflector 106. Optionally, the optical resonator 101 has either an oval, race track, or an elliptical shape; further, optionally, the optical resonator 101 may be a disc resonator. The optical resonator 101 is formed from, and thus, includes, optical waveguide. The optical waveguide used to form the first and second optical waveguides 102, 103 and the optical resonator 101 includes a core and cladding, where the core has a higher index of refraction than the cladding. The optical waveguide used to form each of the optical resonator 101 and the first and the second optical waveguides may be made by planar optical waveguide, optical fiber, or any other type of optical waveguide. Optionally, each of the optical resonator 101, the first optical waveguide 102, and the second optical waveguide 103 are formed by planar optical waveguide on a substrate 100-1; alternatively, such components may be made from optical fiber as can the reflector which may be made with a Bragg grating. Optionally, the optical reflector 106 may be implemented by a loop mirror, e.g., implemented with planar optical waveguide and/or optical fiber.

The first optical waveguide 102 includes a first waveguide port 102-1 and a second waveguide port 102-2. The second optical waveguide 103 includes a third waveguide port 103-1 and a fourth waveguide port 103-2. The optical resonator 101 has a first portion of a surface 101-1 adjacent and optically coupled to a surface 102-3 of the first optical waveguide 102 and a second portion of the surface 101-2 which is adjacent and optically coupled to a surface of 103-3 of the second optical waveguide 103. Optionally, the first portion 101-1 and the second portion 101-2 are diametrically opposite one another. Optical energy is coupled where such adjacent surfaces occur.

The optical reflector 106 may be an optical mirror, an optical Bragg resonator, a loop mirror having a reflection, e.g., a peak reflection, about the carrier frequency of the input optical signal 108, or any other type of optical reflector, e.g., a narrow or a broad-band optical reflector. The optical reflector 106 terminates the third waveguide port 103-1.

The input optical signal 108 is configured to be received at the first waveguide port 102-1. The output optical signal 109 is generated as described above and emitted from the first waveguide port 102-1. Optionally, the second and the fourth waveguide ports 102-2, 103-2 are not optically terminated. The optical filter 100 operates as described elsewhere herein.

Optionally, the optical filter 100 includes the optical signal separation circuit 104. Optionally, the optical signal separation circuit 104 is an optical circulator or an optical coupler. The optical signal separation circuit 104 includes an input circuit port 104-1, an input/output circuit port 104-2, and an output circuit port 104-3. The input optical signal 108 is configured to be received at the input circuit port 104-1 and emitted from the input/output circuit port 104-2 to the first waveguide port 102-1. The output optical signal 109 is configured to be received at the input/output circuit port 104-2 from the first waveguide port 102-1 and emitted from output circuit port 104-3.

Figure 1B:
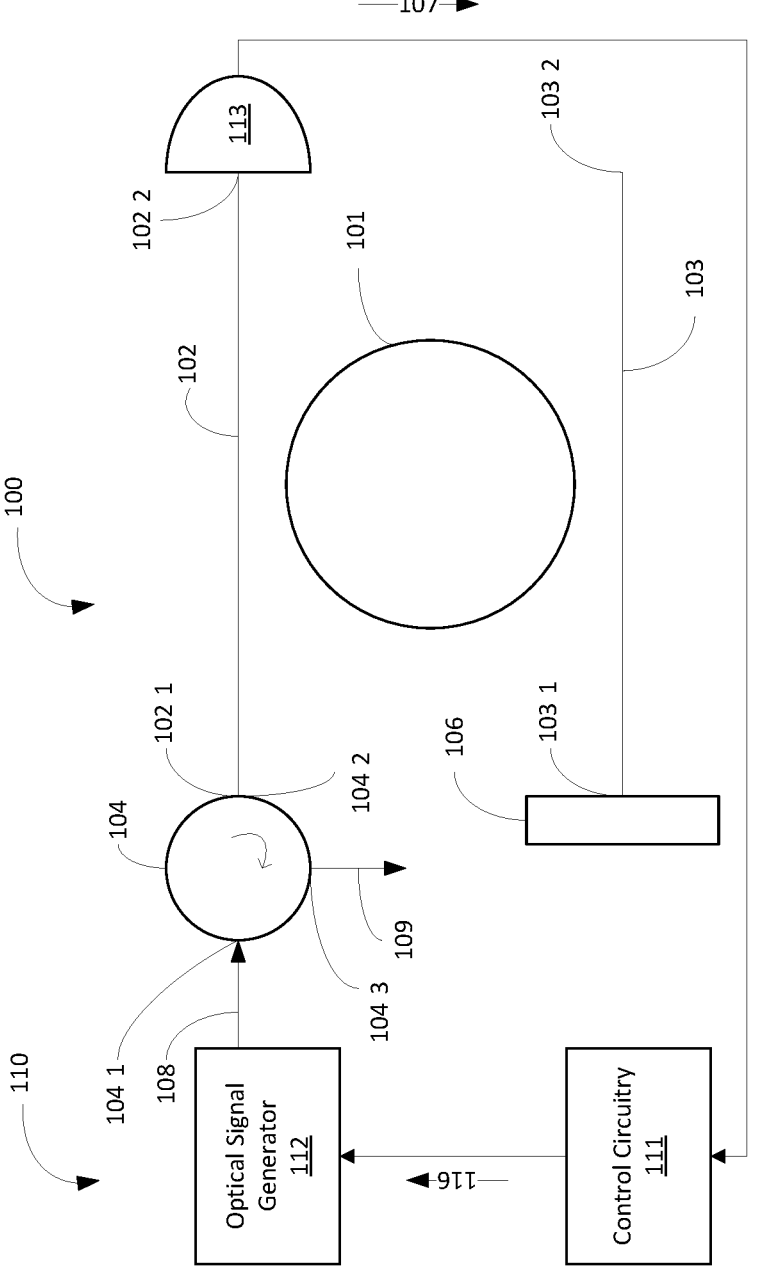
FIG. 1B illustrates a diagram of one embodiment of a filtered optical signal generator according to embodiments of the invention.

FIG. 1B illustrates a diagram of one embodiment of a filtered optical signal generator 110 according to embodiments of the invention. The filtered optical signal generator 110 includes an optical signal generator 112, the optical filter 100 including the optical signal separation circuit 104, an optical detector 113, and control circuitry 111. The optical filter 100 including the optical signal separation circuit 104 operates as described elsewhere herein. The optical signal generator 112 includes a laser.

The optical signal generator 112 is configured to generate the input optical signal 108 and is optically coupled to the input circuit port 104-1 of the optical signal separation circuit 104. The optical signal generator 112 is further coupled, e.g., electrically coupled, to the control circuitry 111.

Optionally, the control circuitry 111 is configured to control a frequency of a carrier wave of the input optical signal 108 generated by the optical signal generator 112. This may be accomplished by directly adjusting a frequency of the carrier wave of the input optical signal 108. Further, a modulation frequency may be modulated on the carrier wave of the input optical signal 108 by varying the frequency of the carrier wave of the input optical signal or by including a phase modulator in the optical signal generator 112 whose phase modulation is controlled by the control circuitry 111. Such modulation frequency may be used to control the frequency of the carrier wave of the input optical signal 108.

The optical detector 113 is optically coupled to the second waveguide port 102-2 and is configured to generate a first control signal 107 responsive to a portion of the input optical signal 108 incident on the optical detector 113 after passing through the optical filter 100. When the input optical signal 108 has a modulated carrier wave, then the optical detector 113 is configured to detect the beat frequency derived from upper and lower sidebands around the carrier wave frequency of the input optical signal 108. Optionally, the first control signal 107 represents an amplitude of the beat frequency. This technique is also known as the Pound-Drever-Hall locking technique.

Optionally, the optical detector 113 is a photosensor configured to generate the first control signal 107 which is an electrical signal whose amplitude is proportional to an optical power of the portion of the input optical signal 108 incident on the optical detector 113 after passing through the optical filter 100.

The control circuitry 111 is coupled, e.g., electrically coupled, to the optical detector 113 and is configured to receive the first control signal 107 and generate a second control signal 116 configured to vary a carrier frequency and/or an amplitude of the input optical signal 108.

Figure 2A:
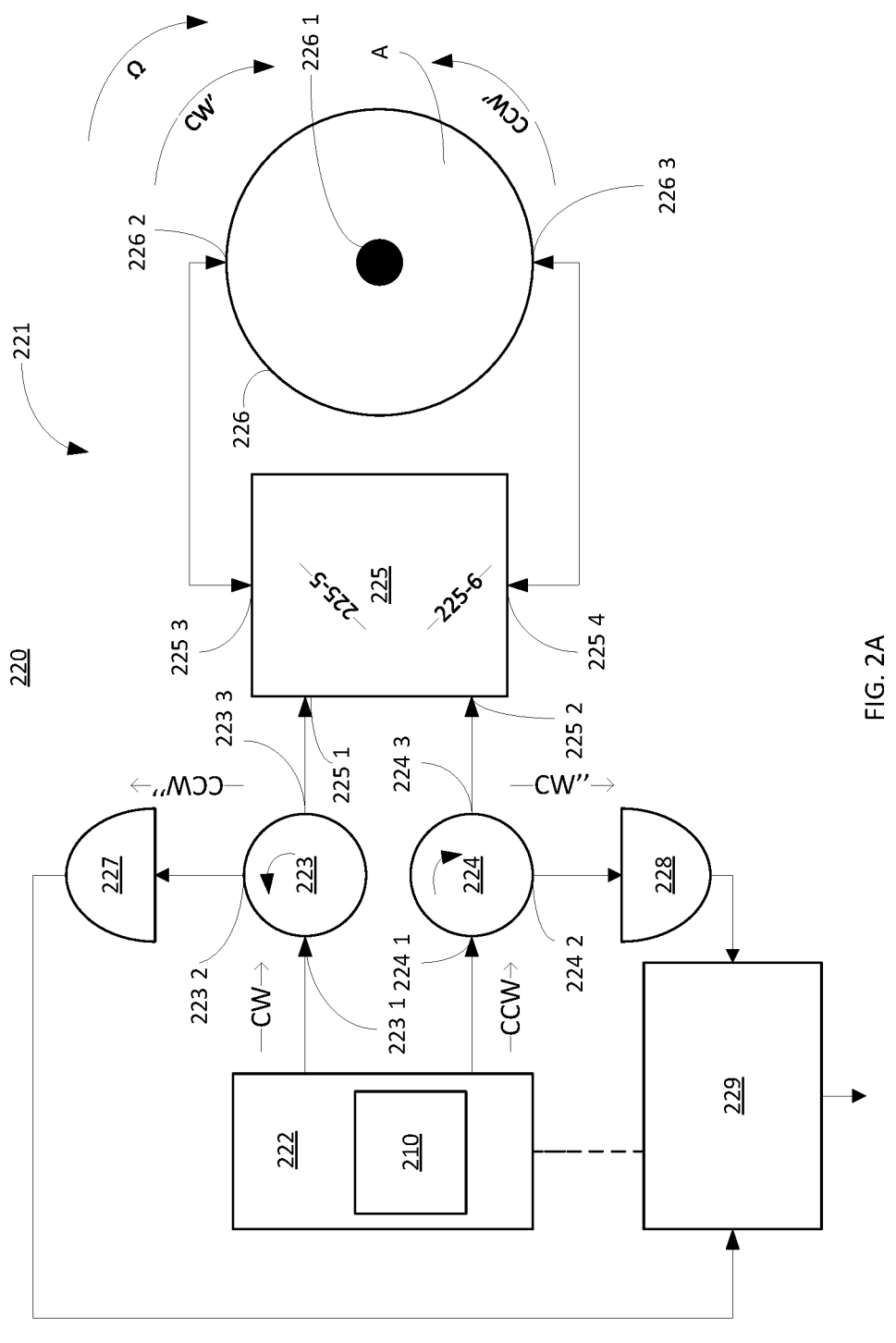
FIG. 2A illustrates a diagram of one embodiment of a resonant fiber optical gyroscope according to embodiments of the invention.

FIG. 2A illustrates a diagram of one embodiment of a resonant fiber optical gyroscope (RFOG) 220 according to embodiments of the invention. The RFOG 220 utilizes at least one filtered optical signal generator according to embodiments of the invention to more accurately determine rate of rotation of the RFOG due to reduction of phase noise in clockwise and counterclockwise signals, and portions thereof. However, because each filtered optical signal generator uses only one filter, the size of the RFOG is not significantly increased.

The RFOG 220 includes an optical signal source 222, a first optical signal separation circuit 223, a second optical signal separation circuit 224, a four port signal separation circuit 225, an optical resonator 226, a counterclockwise frequency detector 227, a clockwise frequency detector 228, and a processing system (or circuit) 229. The optical resonator 226 may also be referred to as an optical resonator coil. Optionally, the optical signal source 222 is coupled to the processing system 229.

The illustrated first optical signal separation circuit 223 includes a first signal separation port 223-1, a second signal separation port 223-2, and a third signal separation port 223-3. The illustrated second optical signal separation circuit 224 includes a fourth signal separation port 224-1, a fifth signal separation port 224-2, and a sixth signal separation port 224-3. The illustrated four port signal separation circuit 225 includes a seventh signal separation port 225-1, an eighth signal separation port 225-2, a ninth signal separation port 225-3, and a tenth signal separation port 225-4. The illustrated optical resonator 226 includes a first resonator port 226-2 and a second resonator port 226-3. The RFOG 220 may include other components not described herein for purposes of clarity.

The embodiment illustrated in FIG. 2A is implemented as follows. The first resonator port 226-2 and the second resonator port 226-3 are optically coupled respectively to the ninth signal separation port 225-3 and the tenth signal separation port 225-4. The seventh signal separation port 225-1 and the eighth signal separation port 225-2 are optically coupled respectively to the third signal separation port 223-3 and the sixth signal separation port 224-3. The second signal separation port 223-2 and the fifth signal separation port 224-2 are optically coupled respectively to the counterclockwise frequency detector 227 and the clockwise frequency detector 228.

Optionally, the optical signal source 222 includes two filtered optical signal generators where one filtered optical signal generator is used to generate the clockwise optical signal CW and the other filtered optical signal generator is used to generate the counterclockwise optical signal CCW. Alternatively, a single filtered optical signal generator can be used to generate the clockwise optical signal CW or the counterclockwise optical signal CCW; this may be accomplished, for example, by using an optical splitter optically coupled to an output of the single filtered optical signal generator and a phase modulator optically coupled to each output of the splitter and may be configured to generate respectively the counterclockwise optical signal CCW or the clockwise optical signal CW.

The optical signal source 222 is configured to generate a clockwise optical signal CW and a counterclockwise optical signal CCW, and includes at least one filtered optical signal generator 210 an embodiment of which is described with respect to FIG. 1B herein. In the embodiment illustrated in FIG. 2A, the clockwise optical signal CW and the counterclockwise optical signal CCW are optically coupled from the optical signal source to respectively the first signal separation port 223-1 and the fourth signal separation port 224-1.

The four port signal separation circuit 225 includes two mirrors 225-5, 225-6. One example of a four port signal separation circuit 225 is described in U.S. Pat. No. 11,204, 246 which is incorporated by reference herein in its entirety. Another example of signal separation circuit 225 is a four-port optical coupler. The optical resonator 226 is made from a coil of optical waveguide, e.g., optical fiber, wound around a rotation axis 226-1. The RFOG 220 is configured to determine a rotation rate, e.g., of a body 221 to which the RFOG is attached, around the rotation axis 226-1. Each frequency detector 227, 228 is configured to determine a frequency of the optical signal incident upon the frequency detector; the difference between each such frequencies is proportional to the rotation rate about the rotation axis 226-1.

A portion CW' of the clockwise optical signal CW is conveyed from the optical signal source 222 through the first optical signal separation circuit 223 and the four port signal separation circuit 225 into the optical resonator 226. A first portion CW" of the portion CW' of the clockwise optical signal CW is conveyed from the optical resonator 226 through the four port signal separation circuit 225 and the second optical signal separation circuit 224 to the clockwise frequency detector 228. The first portion CW" and the second portion CCW" respectively circulate clockwise and counterclockwise around the optical resonator 226.

A portion CCW of the clockwise optical signal CCW is conveyed from the optical signal source 222 through the second optical signal separation circuit 224 and the four port signal separation circuit 225 into the optical resonator 226. A second portion CCW" of the portion CCW' of the counterclockwise optical signal CCW is conveyed from the optical resonator 226 through the four port signal separation circuit 225 and the first optical signal separation circuit 223 to the counterclockwise frequency detector 227.

Figure 2B:
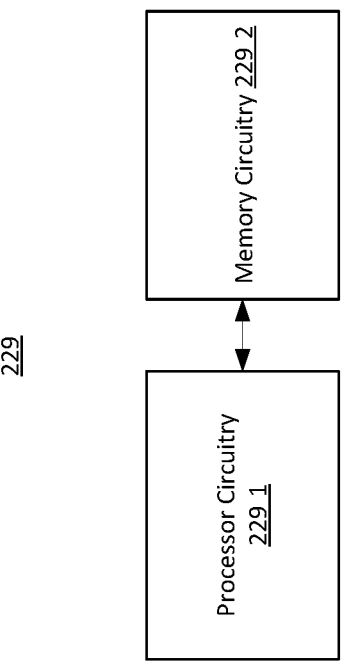
FIG. 2B illustrates a block diagram of one embodiment of a processing system.

FIG. 2B illustrates a block diagram of one embodiment of a processing system 229. In the embodiment illustrated in FIG. 2B, the processing system 229 includes processor circuitry 229-1 electrically coupled to memory circuitry 229-2.

Returning to FIG. 2A, the processing system 229 is configured to receive a frequency of the first portion CW‴ from the clockwise frequency detector 228. The processing system 229 is further configured to receive a frequency of the second portion CCW‴ from the counterclockwise frequency detector 227. Using a difference of the frequency of the first portion CW‴ and the frequency of the second portion CCW‴, the processing system 229 is configured to determine, and optionally provide to a system or user, the rate of rotation, Q, around the rotation axis 226-1. Also, the rate of rotation Q, around the rotation axis, is determined also using a wavelength of the clockwise optical signal CW and the counterclockwise optical signal CCW (or an average of both the second portion CCW‴ and a wavelength of the clockwise optical signal CW and the counterclockwise optical signal CCW), and an area A of a cross-section of the optical resonator 226. Because each of the first portion CW‴ and the second portion CCW‴ have lower phase noise, the rate of rotation, Q, around the rotation axis 226-1 can be more accurately determined.

FIG. 3 illustrates a flow diagram of one embodiment of a method 330 for emitting an optical beam with reduced phase noise according to embodiments of the invention. The methods illustrated herein may be implemented with the apparatus illustrated and described with respect to FIGS. 1A, 1B, and/or 2, but may be implemented in other ways as well.

The blocks of the flow diagrams have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

In block 330A, a first optical signal is received at a first port of an optical filter, e.g., the optical filter described with respect to FIG. 1A. In block 330B, the first optical signal is filtered by the optical filter. In block 330C, a first filtered optical signal is emitted from a second port of the optical filter. In block 330D, the first filtered optical signal is reflected, e.g., by the reflector. back into the second port. In block 330E, the first reflected, filtered optical signal is further filtered by the filter. In block 330F, a first twice filtered optical signal is emitted from the first port of the optical filter.

In optional block 330G, a portion of the first optical signal is emitted from a third port of the optical filter. In optional block 330H, using the portion of the first optical signal, at least one of the amplitude and a frequency of the first optical signal is adjusted. Optionally, block 330H may be implemented in the manner described in FIG. 1B, e.g., with respect to the optical detector 113, first control signal 107, and control circuitry 111.

In optional block 330I, a second twice filtered optical signal is generated. The second twice filtered optical signal may be generated either using the first twice filtered optical signal or generated independently of the first twice filtered optical signal using all or some of blocks similar to blocks 330A-F and optionally blocks 330G-H.

In optional block 330J, a portion of the first twice filtered optical signal and a portion of the second twice filtered optical signal are each coupled into an optical resonator (or optical resonator coil), e.g., as further described elsewhere herein. In optional block 330K, the portion of the first twice filtered optical signal and a portion of the second twice filtered optical signal propagate around the optical resonator in different directions, e.g., respectively clockwise and counterclockwise or vice versa.

In block 330L, a portion of the portion of the first twice filtered optical signal and a portion of the portion of the second twice filtered optical signal are each emitted from the optical resonator. In optional block 330M, a frequency of each of the portion of the portion of the first twice filtered optical signal and the portion of the portion of the second twice filtered optical signal are determined. Optionally, block 330M may be implemented as further described elsewhere herein. In optional block 330N, a rate of rotation around a rotation axis of the optical resonator is determined, e.g., as further described elsewhere herein.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and/or the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

Terms of relative position as used in this application are defined based on a plane parallel to the conventional plane or working surface of a material (e.g., a layer or a substrate), regardless of orientation. Terms such as "on," "higher," "lower," "over," "top," and "under" are defined with respect to the conventional plane or working surface being on the top surface of a layer or substrate, regardless of orientation. The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes an apparatus for reducing phase noise of an optical signal, the apparatus comprising: a first optical waveguide comprising a first surface, a first port, and a second port; a second optical waveguide comprising a second surface, a third port, and a fourth port; an optical resonator comprising a first portion of a third surface and a second portion of the third surface; wherein the first surface is adjacent and optically coupled to the first portion of the third surface; wherein the second surface is adjacent and optically coupled to the second portion of the third surface; and an optical reflector optically coupled to the third port.

Example 2 includes the apparatus of Example 1, wherein the optical resonator is an optical ring resonator, an optical disc resonator, or an optical race track resonator.

Example 3 includes the apparatus of any of Examples 1-2, wherein the optical reflector is a mirror, a Bragg grating, or a loop mirror.

Example 4 includes the apparatus of any of Examples 1-3, wherein the first and the second optical waveguides and the optical resonator each comprise planar optical waveguide formed on a substrate.

Example 5 includes the apparatus of any of Examples 1-4, further comprising an optical signal separation circuit comprising an input/output port optically coupled to the first port, an input port, and an output port.

Example 6 includes the apparatus of Example 5, wherein the optical signal separation circuit comprises an optical circulator or an optical coupler.

Example 7 includes the apparatus of any of Examples 5-6, further comprising: an optical signal generator comprising a laser and optically coupled to the input port and configured to emit the optical signal; an optical detector optically coupled to the second port; and control circuitry coupled to the optical detector and the optical signal generator.

Example 8 includes the apparatus of Example 7, wherein the control circuitry is configured to adjust at least one of an amplitude and a frequency of the optical signal emitted from the optical signal generator.

Example 9 includes the apparatus of any of Examples 7-8, wherein the optical detector comprises a photosensor configured to generate a first control signal which is an electrical signal whose amplitude is proportional to an optical power of the portion of the optical signal incident on the optical detector.

Example 10 includes a method for reducing phase noise of an optical signal, the method comprising: receiving a first optical signal at a first port of a filter; filtering the first optical signal; emitting a first filtered optical signal from a second port of the filter; reflecting the first filtered optical signal into the second port of the filter; and emitting a first twice filtered optical signal from the first port of the filter.

Example 11 includes the method of Example 10, further comprising: emitting a portion of the first optical signal from a third port of the filter; and using the portion of the first optical signal, adjusting at least one of an amplitude and a frequency of the first optical signal.

Example 12 includes the method of any of Examples 10-11, further comprising: generating a second twice filtered optical signal; coupling a portion of the first twice filtered optical signal and a portion of the second twice filtered optical signal into an optical resonator; propagating, in different directions around the optical resonator, the portion of the first twice filtered optical signal and the portion of the second twice filtered optical signal; emitting, from the optical resonator, a portion of the portion of the first twice filtered optical signal and a portion of the portion of the second twice filtered optical signal; determine a frequency of each of the portion of the portion of the first twice filtered optical signal and the portion of the portion of the second twice filtered optical signal; and using a difference between each determined frequency, determine a rate of rotation around a rotation axis of the optical resonator.

Example 13 includes the method of Example 12, wherein the second twice filtered optical signal is generated from the first twice filtered optical signal.

Example 14 includes the method of any of Examples 12-13, wherein determining the rate of rotation comprises determining the rate of rotation using the difference between each determined frequency, an average of a wavelength of the first twice filtered optical signal and the second twice filtered optical signal, and an area of a cross-section of the optical resonator.

Example 15 includes a resonant fiber optical gyroscope (RFOG) comprising: an optical signal source comprising at least one filtered optical signal generator and configured to generate a first twice filtered optical signal and a second twice filtered optical signal, wherein each filtered optical signal generator comprises: an optical filter comprising: a first optical waveguide comprising a first surface, a first port, and a second port, wherein the first port is configured to emit the first twice filtered optical signal; a second optical waveguide comprising a second surface, a third port, and a fourth port; an optical resonator comprising a first portion of a third surface and a second portion of the third surface; wherein the first surface is adjacent and optically coupled to the first portion of the third surface; wherein the second surface is adjacent and optically coupled to the second portion of the third surface; and an optical reflector optically coupled to the third port; an optical signal separation circuit comprising an input/output port optically coupled to the first port, an input port, and an output port; an optical signal generator comprising a laser and optically coupled to the input port and configured to emit an optical signal; an optical detector optically coupled to the second port; and control circuitry coupled to the optical detector and the optical signal generator; a first optical signal separation circuit comprising a first circuit port, a second circuit port, and a third circuit port, and configured to receive, at the first circuit port, the first twice filtered optical signal from the optical signal source; a second optical signal separation circuit comprising a fourth circuit port, a fifth circuit port, and a sixth circuit port, and configured to receive, at the fourth circuit port, the second twice filtered optical signal from the optical signal source; an optical resonator comprising a rotation axis; a four port signal separation circuit comprising two mirrors, a seventh circuit port optically coupled to the third circuit port, an eighth circuit port optically coupled to the sixth circuit port, an ninth circuit port, and a tenth circuit port, wherein the ninth and tenth circuit ports are optically coupled to the optical resonator, wherein the four port signal separation circuit is configured to optically couple a portion of each of the first twice filtered and the second twice filtered optical signals into the optical resonator; processing circuitry comprising processor circuitry electrically coupled to memory circuitry; a first frequency detector coupled to the second circuit port and the processing circuitry, and configured to determine a frequency of a portion of the portion of the second twice filtered optical signal emitted from the optical resonator; wherein the four port signal separation circuit is further configured to optically couple a portion of the portion of the first twice filtered optical signal to the first frequency detector; and a second frequency detector coupled to the fifth circuit port and the processing circuitry, and configured to determine a frequency of a portion of the portion of the first twice filtered optical signal emitted from the optical resonator; wherein the four port signal separation circuit is further configured to optically couple a portion of the portion of the second twice filtered optical signal to the second frequency detector; wherein the processing circuitry is configured to determine a rate of rotation around the rotation axis of the optical resonator using the frequency of a portion of the portion of the first twice filtered optical signal and the frequency of a portion of the portion of the second twice filtered optical signal.

Example 16 includes the RFOG of Example 15, wherein the optical resonator is an optical ring resonator, an optical disc resonator, or an optical race track resonator.

Example 17 includes the RFOG of any of Examples 15-16, wherein the optical reflector is a mirror, a Bragg grating, or a loop mirror.

Example 18 includes the RFOG of any of Examples 15-17, wherein the optical signal separation circuit comprises an optical circulator or an optical coupler.

Example 19 includes the RFOG of any of Examples 15-18, wherein the control circuitry is configured to adjust at least one of an amplitude and a frequency of an optical signal emitted from the optical signal generator.

Example 20 includes the RFOG of any of Examples 15-19, wherein the optical detector comprises a photosensor configured to generate a first control signal which is an electrical signal whose amplitude is proportional to an optical power of the portion of the first twice filtered optical signal incident on the optical detector.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An apparatus for reducing phase noise of an input optical signal, the apparatus comprising:
   a first optical waveguide comprising a first surface, a first port, and a second port, wherein the first port is configured to receive, through an optical circulator, the input optical signal from a laser external to the first optical waveguide, a second optical waveguide, and an optical resonator;
   the second optical waveguide comprising a second surface, a third port, and a fourth port;
   the optical resonator comprising a first portion of a third surface and a second portion of the third surface;
   wherein the first surface is adjacent and optically coupled to the first portion of the third surface;
   wherein the second surface is adjacent and optically coupled to the second portion of the third surface;
   an optical reflector configured to reflect optical energy emitted from the third port back into the third port;
   the optical circulator comprising an input/output port, an input port, and an output port, wherein the input/output port is optically coupled to the first port;
   wherein the input optical signal propagates from the input port, through the optical circulator, and then out of the input/output port;
   wherein the first port is configured to emit an output optical signal which is derived from the input optical signal and propagates from the input/output port to out of the output port;
   an optical detector optically coupled to the second port and configured to emit a control signal responsive to a portion of the input optical signal incident on the optical detector; and
   control circuitry coupled between the optical detector and the laser, configured to receive the control signal, and further configured to adjust at least one of an amplitude and a frequency of the input optical signal emitted from the laser.

2. The apparatus of claim 1, wherein the optical resonator is an optical ring resonator, an optical disc resonator, or an optical race track resonator.

3. The apparatus of claim 1, wherein the optical reflector is a mirror, a Bragg grating, or a loop mirror.

4. The apparatus of claim 1, wherein the first and the second optical waveguides and the optical resonator each comprise planar optical waveguide formed on a substrate.

5. The apparatus of claim 1, wherein the optical detector comprises a photosensor configured to generate the control signal which is an electrical signal whose amplitude is proportional to an optical power of the portion of the input optical signal incident on the optical detector.

6. A method for reducing phase noise of a first optical signal, the method comprising:
   receiving, from an input/output port of an optical circulator, the first optical signal at a first port of a filter, wherein the first optical signal is externally provided from a laser to an input port of the optical circulator;
   filtering, with the filter, the first optical signal;
   emitting a first filtered optical signal from a second port of the filter;
   reflecting the first filtered optical signal into the second port of the filter;
   emitting a first twice filtered optical signal from the first port of the filter, through the optical circulator, and then from an output port of the optical circulator;
   emitting a portion of the first optical signal from a third port of the filter; and
   using the portion of the first optical signal, adjusting at least one of an amplitude and a frequency of the first optical signal.

7. The method of claim 6, further comprising:
   generating a second twice filtered optical signal;
   coupling a portion of the first twice filtered optical signal and a portion of the second twice filtered optical signal into an optical resonator;
   propagating, in different directions around the optical resonator, the portion of the first twice filtered optical signal and the portion of the second twice filtered optical signal;
   emitting, from the optical resonator, a portion of the portion of the first twice filtered optical signal and a portion of the portion of the second twice filtered optical signal;
   determine a frequency of each of the portion of the portion of the first twice filtered optical signal and the portion of the portion of the second twice filtered optical signal; and
   using a difference between each determined frequency, determine a rate of rotation around a rotation axis of the optical resonator.

8. The method of claim 7, wherein the second twice filtered optical signal is generated from the first twice filtered optical signal.

9. The method of claim 7, wherein determining the rate of rotation comprises determining the rate of rotation using the difference between each determined frequency, an average of a wavelength of the first twice filtered optical signal and the second twice filtered optical signal, and an area of a cross-section of the optical resonator.

10. A resonant fiber optical gyroscope (RFOG) comprising:
   an optical signal source comprising at least one filtered optical signal generator and configured to generate a first twice filtered optical signal and a second twice filtered optical signal, wherein each filtered optical
signal generator comprises:
an optical filter comprising:
    a first optical waveguide comprising a first surface,
      a first port, and a second port, wherein the first port
      is configured to receive, through an optical circu-
      lator, an input optical signal provided by an optical
      signal generator;
    a second optical waveguide comprising a second
      surface, a third port, and a fourth port;
    an optical resonator comprising a first portion of a
      third surface and a second portion of the third
      surface;
    wherein the first surface is adjacent and optically
      coupled to the first portion of the third surface;
    wherein the second surface is adjacent and optically
      coupled to the second portion of the third surface;
      and
    an optical reflector configured to reflect optical
      energy emitted from the third port back into the
      third port;
the optical circulator comprising an input/output port
    optically coupled to the first port, an input port, and
    an output port;
wherein the input optical signal propagates from the
    input port, through the optical circulator, and then
    out of the input/output port;
wherein the twice filtered optical signal is derived from
    the input optical signal and propagates from the first
    port, into the input/output port, and out of the output
    port;
the optical signal generator comprising a laser and
    optically coupled to the input port and configured to
    emit the input optical signal;
an optical detector optically coupled to the second port
    and configured to emit a control signal responsive to
    a portion of the input optical signal incident on the
    optical detector; and
control circuitry between the optical detector and the
    optical signal generator, configured to receive the
    control signal, and further configured to adjust at
    least one of an amplitude and a frequency of the
    input optical signal emitted from the laser;
a first optical signal separation circuit comprising a first
    circuit port, a second circuit port, and a third circuit
    port, and configured to receive, at the first circuit port,
    the first twice filtered optical signal from the optical
    signal source;
a second optical signal separation circuit comprising a
    fourth circuit port, a fifth circuit port, and a sixth circuit port, and configured to receive, at the fourth circuit
    port, the second twice filtered optical signal from the
    optical signal source;
an optical resonator comprising a rotation axis;
a four port signal separation circuit comprising two mir-
    rors, a seventh circuit port optically coupled to the third
    circuit port, an eighth circuit port optically coupled to
    the sixth circuit port, an nineth circuit port, and a tenth
    circuit port, wherein the nineth and tenth circuit ports
    are optically coupled to the optical resonator, wherein
    the four port signal separation circuit is configured to
    optically couple a portion of each of the first twice
    filtered and the second twice filtered optical signals into
    the optical resonator;
processing circuitry comprising processor circuitry elec-
    trically coupled to memory circuitry;
a first frequency detector coupled to the second circuit
    port and the processing circuitry, and configured to
    determine a frequency of a portion of the portion of the
    second twice filtered optical signal emitted from the
    optical resonator;
wherein the four port signal separation circuit is further
    configured to optically couple a portion of the portion
    of the first twice filtered optical signal to the first
    frequency detector; and
a second frequency detector coupled to the fifth circuit
    port and the processing circuitry, and configured to
    determine a frequency of a portion of the portion of the
    first twice filtered optical signal emitted from the
    optical resonator;
wherein the four port signal separation circuit is further
    configured to optically couple a portion of the portion
    of the second twice filtered optical signal to the second
    frequency detector;
wherein the processing circuitry is configured to deter-
    mine a rate of rotation around the rotation axis of the
    optical resonator using the frequency of a portion of the
    portion of the first twice filtered optical signal and the
    frequency of a portion of the portion of the second
    twice filtered optical signal.

11. The RFOG of claim 10, wherein the optical resonator
is an optical ring resonator, an optical disc resonator, or an
optical race track resonator.

12. The RFOG of claim 10, wherein the optical reflector
is a mirror, a Bragg grating, or a loop mirror.

13. The RFOG of claim 10, wherein the optical detector
comprises a photosensor configured to generate the control
signal which is an electrical signal whose amplitude is
proportional to an optical power of the portion of the first
twice filtered optical signal incident on the optical detector.

\* \* \* \* \*